(12) United States Patent
Unruh

(10) Patent No.: US 6,678,688 B1
(45) Date of Patent: Jan. 13, 2004

(54) METHOD AND APPARATUS FOR COMPOSITE FONT GENERATION

(75) Inventor: Erland Unruh, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 280 days.

(21) Appl. No.: 09/697,556

(22) Filed: Oct. 26, 2000

(51) Int. Cl.$^7$ ................................................ G06F 17/30
(52) U.S. Cl. ..................... 707/101; 707/100; 707/102; 345/26; 345/472
(58) Field of Search .................... 707/101, 102–513; 345/170, 471, 467, 472, 26, 472.1

(56) References Cited

U.S. PATENT DOCUMENTS

| | | | | |
|---|---|---|---|---|
| 4,353,653 | A | | 10/1982 | Zimmerman ................. 400/70 |
| 4,881,197 | A | * | 11/1989 | Fischer ....................... 715/530 |
| 4,953,102 | A | | 8/1990 | Kimura et al. .............. 364/518 |
| 5,108,208 | A | | 4/1992 | Gardner ...................... 400/121 |
| 5,404,436 | A | * | 4/1995 | Hamilton .................... 345/472 |
| 5,453,938 | A | | 9/1995 | Gohara et al. .............. 364/514 |
| 5,570,459 | A | * | 10/1996 | Kam ........................... 358/1.11 |
| 5,586,241 | A | * | 12/1996 | Bauermeister et al. ...... 345/170 |
| 5,586,242 | A | | 12/1996 | McQueen, III et al. ..... 395/167 |
| 5,684,510 | A | * | 11/1997 | Brassell et al. ............. 345/443 |
| 5,710,880 | A | * | 1/1998 | Howlett et al. .............. 345/467 |
| 5,748,956 | A | * | 5/1998 | Lafer et al. .................. 345/863 |
| 5,832,231 | A | * | 11/1998 | Raman et al. ............... 709/234 |
| 5,877,776 | A | | 3/1999 | Beaman et al. ............. 345/472 |
| 5,983,225 | A | * | 11/1999 | Anfindsen ....................... 707/8 |
| 5,983,247 | A | * | 11/1999 | Yamanaka et al. .......... 707/513 |
| 6,065,008 | A | * | 5/2000 | Simon et al. ................ 345/467 |
| 6,411,971 | B1 | * | 6/2002 | Meier et al. ............. 715/500.1 |
| 6,415,303 | B1 | * | 7/2002 | Meier et al. ............. 715/500.1 |
| 2002/0085006 | A1 | * | 7/2002 | Shade et al. ................ 345/471 |
| 2002/0124029 | A1 | * | 9/2002 | Gwinn et al. ............... 707/542 |

FOREIGN PATENT DOCUMENTS

| EP | 105904 | 5/2001 |
|---|---|---|
| JP | 07200561 | 8/1995 |

OTHER PUBLICATIONS

Zongker et al., Article entitled "Example Based Hinting of TrueType Fonts", ACM, 2000 1–58113–208–5, pp411–416.*
Kavianifar et al., Article entitled "Preprossing and structural feature extraction for a Multi–Fonts Arabic/Persian OCR", Document Analysis and Recognition, 1999. ICDAR '99. Proceedings ofthe Fifth International Conference on , Sep. 20–22.*
Hersch et al., "Model based matching and Hinting of Fonts", CAN–0–89791, pp. 71–80.*
Standard Search Report for RS 105904 US Completed May 11, 2001, May 16, 2001, EPO.

* cited by examiner

Primary Examiner—Jean M Corrielus
(74) Attorney, Agent, or Firm—Jenkens & Gilchrist, P.C.

(57) ABSTRACT

A font database includes a plurality of font files each of which stores bitmaps associated with a range of characters. The plurality of font files contains only a single version of a bitmap for each character. In a first embodiment, a plurality of composite font files contain one of more pointers pointing to selected ones of said plurality of font files. In a second embodiment, a rules set responsive to a print request retrieves a desired font file to print a character in accordance with the established rule set.

18 Claims, 3 Drawing Sheets

METHOD AND APPARATUS FOR COMPOSITE FONT GENERATION

TECHNICAL FIELD

The present invention relates to the generation of fonts, and more particularly, to the use of composite fonts to minimizing the font storage area for an apparatus using a plurality of different fonts.

BACKGROUND OF THE INVENTION

With the increasing number of electronic devices that are usable with a wide variety of applications and within a number of markets and countries wherein different languages are used, the amount of storage for numerous types of fonts has become increasingly problematic. Fonts may comprise one of a number of different types. Vector based and synthesized fonts (for example TrueType) may be used for larger characters and do not require a significant amount of storage space for containing the fonts. However, vector based and synthesized fonts do not work very well for smaller characters having a small number of pixels. Instead, bitmap fonts are used for smaller characters wherein each character is handmade at the pixel level. Unfortunately, bitmap fonts require a large amount of storage area, especially in the case of Chinese and Japanese character sets, and even a greater amount of storage area when a variety of styles are required for the different characters such as various point sizes, bolded versus non-bolded characters and italicized versus non-italicized characters.

The main problem arising from the use of bitmap fonts comes from the storage requirements which are necessary to store information on a large number of fonts. For example, several hundred kilobytes may be required for just one font. Thus, if each character requires five different point sizes, three different types of bolding and three different types of italics for each character, the storage space necessary for the font can easily take up five to ten megabytes. Since many types of portable electronic equipment may only contain a few megabytes (for example, four megabytes) of flash memory for storage, this type of storage requirement is unacceptable. The only presently known solution is to limit the number of styles in order to save resources, however, this sacrifices the look and appearance of the characters upon a display. Thus, present solutions to this problem must either limit the look of characters provided by display or increase the application complexity in order to make the best use of the available fonts.

SUMMARY OF THE INVENTION

The present invention overcomes the foregoing and other problems with a method and apparatus for composite font generation. In a first embodiment, a font system includes a plurality of font files, each of which stores bitmaps associated with a range of characters. The plurality of font files only contains a single version of each bitmap for a character. Associated with the plurality of font files are a plurality of composite font files which contain a number of pointers pointing to ones of the plurality of font files. Each font file may have one or more pointers pointing at the font file.

In a further embodiment, the font system again includes the plurality of font files each of which stores bitmaps associated with a particular range of characters. The plurality of font files again only contain a single version of a bitmap for a character. A rules set enables the generation of a selected font responsive to a print request. The rules, in response to the print request, select a desired font file based upon the established rules in order to print the requested character.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION

In order to support international characters in a variety of sizes, type faces, configurations and alphabets, the Unicode standard is widely used. A font that uses the Unicode standard supports different ranges (alphabets) of characters between 0 and 65535. When implementing fonts in the normal fashion, up to 25% of this range may be utilized. This method of creating a font file involves generating bitmaps for all individual characters and placing them in a large file. If an additional font file is required, (i.e., Arial, 12$p$, bold, non-italic) which uses some of the same bitmaps as the previously created font file, the repeated bitmaps would be copied into the new file as well, taking up twice the space. This is, of course, a problem with ranges (alphabets) that are very rarely used or cannot have different styles applied to them. For example, Chinese characters do not need to be bolded or italicized. Likewise, Cyrillic characters included within Asian equipment are not very likely to be used and may only be required in one style, and/or one size.

Figure 1:
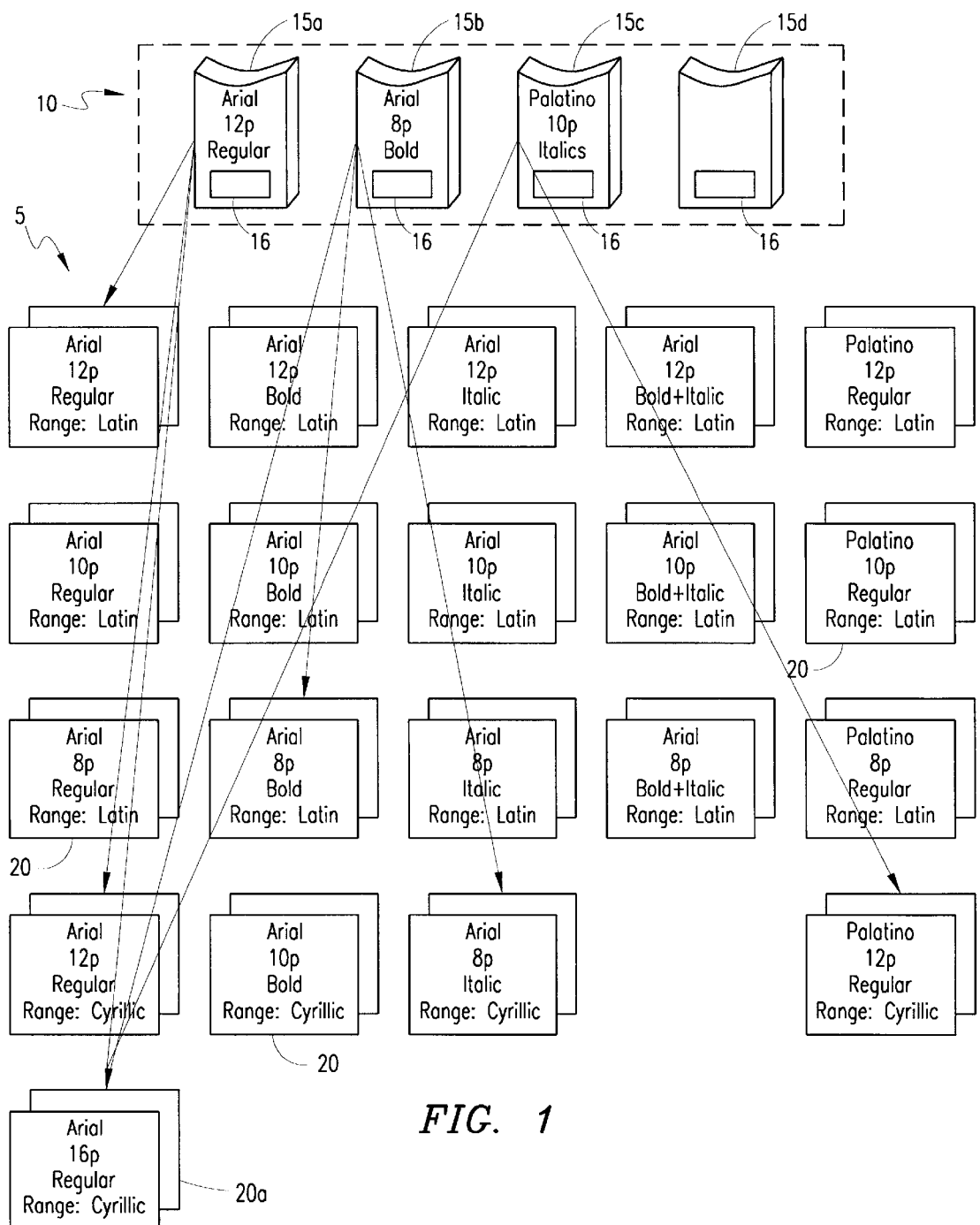
FIG. 1 is an illustration of a first embodiment of the present invention.

Referring now to the drawings, and more particularly to FIG. 1, there is illustrated the manner in which a composite font database 5 including a number pointers to various font files 15 may be created. The composite font database 5 includes a number of composite fonts 15 which each contain pointers 16 pointing to various font files 20 included within the composite font. Each of the font files 20 include a range of characters each of which is defined by a bitmap. Each of the font files 20 are only stored once within a device in which the composite font database 10 is created.

The first composite font file 15$a$ designated "Arial, 12$p$, Regular" comprises pointers 16 to font files 20 for "Arial, 12$p$, Regular, Range: Latin"; "Arial, 12$p$, Regular, Range: Cyrillic"; and "Arial, 16$p$, Regular, Range: Chinese". The composite font file 15$b$ designated "Arial, 8$p$, Bold" includes pointers to font files 20 for "Arial, 16$p$, Regular, Range: Chinese"; "Arial, 8$p$, Bold, Range: Latin"; "Arial, 8$p$, Bold, Range: Latin"; and "Arial, 8$p$, Regular, Range: Cyrillic". Finally, composite font file 15$c$ designated "Palatino, 10$p$, Italics" includes pointers 16 to font files 20 for "Arial, 16$p$, Regular, Range: Chinese" and "Palatino, 12$p$, Regular, Range: Cyrillic". Assignment of various font files 20 continues until all desired composite font files 15 are created. Each font file 20 contains only a single version of a bitmap and is stored only once. The composite font files 15 may have multiple pointers directed to a same font file 20. See, for example, the font file (Arial, 16*p*, Regular, Range: Chinese) of FIG. 1 which has three pointers 16 directed to the font file 20*a*. Thus, this font file 20*a* must only be stored once rather than three times.

A composite font file 15 also may have associated with it a font file 20 having bitmaps for characters larger than the composite font file 15 may expect. For example, the "Arial, 16*p*, regular, Range: Chinese" font file 15 pointed to by the "Arial, 8*p*, regular" composite font file 20 because "Arial, 8*p* regular, Range: Chinese" does not exist. Thus, when a font size does not exist or is undesirable for a particular character range, the next largest size of font may be used. Whether or not this association is utilized is up to the system designer. In a system that may handle different size characters (dynamic line height) this system should work quite well.

Figure 2:
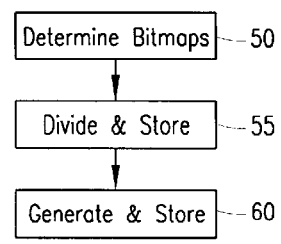
FIG. 2 is a flow diagram illustrating the method for implementing the embodiment of FIG. 1.

Referring now to FIG. 2, there is illustrated a flow diagram of the method for generating a composite font database 5 as illustrated in FIG. 1. Initially, the bitmaps for each character to be used within the database are determined at step 50. The bitmaps are divided and stored at step 55 into a plurality of font ranges (font files) wherein each of the plurality of font ranges contains only a single version of each bitmap. Finally, the composite font files, containing a number of pointers, are each generated and stored at step 60. The font files 20 and composite font files 15 require significantly less storage area than prior art font databases because only a single version of a bitmap is stored but the bitmap may have multiple pointers pointing thereto. The composite font files 15 includes pointers to the various font files stored previously at step 55.

Figure 3:
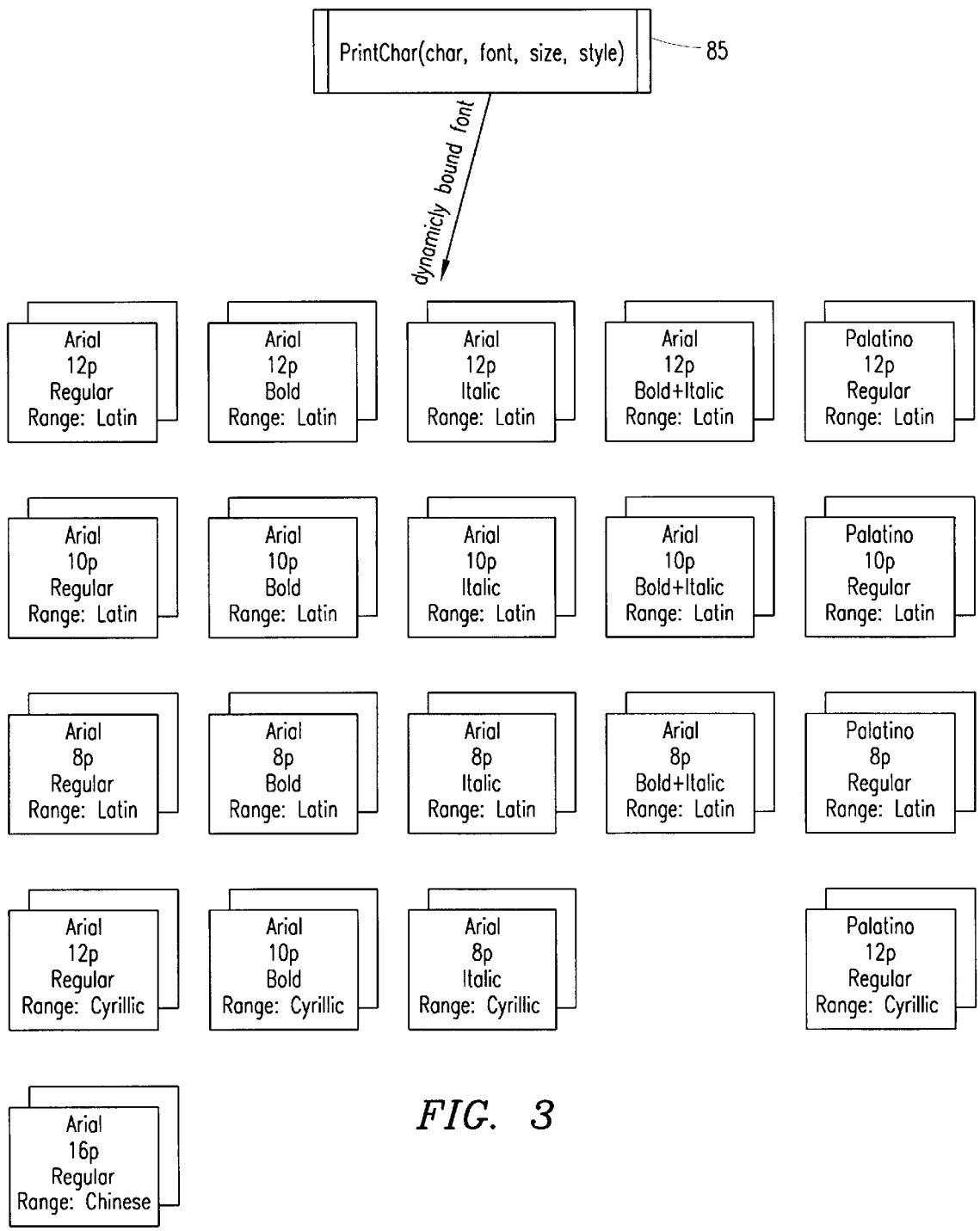
FIG. 3 illustrates a second embodiment of the present invention.
Figure 4:
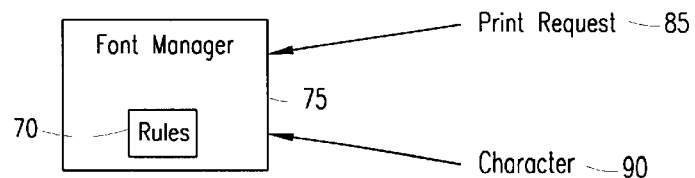
FIG. 4 illustrates the operation of a font manager configured according to the second embodiment of the invention.

Referring now to FIGS. 3 and 4, there is illustrated an alternative embodiment for generating a self-optimizing composite font. The font files 20 including only a single version of each bitmap for various ranges are stored as described previously with respect to FIG. 1. The composition rules 70 for generating a font are stored within a system font manager 75. The composition rules 70 implement the pointers described previously with respect to FIG. 1 responsive to a print request 85. Therefore, rather than including a number of composite font files 15 as described previously, this embodiment includes rules defining which bitmap should be retrieved from which font file 20 responsive to a print request 85. The font manager 75 generates the requested fonts in real time responsive to a print request 85 coming from a user or electronic device. The print request 85 includes the character to be printed, and has attached therewith the font name, font size and font style to be printed. Responsive to the this information, the font manager 75 utilizes the composition rules 70 to determine which font file 20 to access for a needed bitmap to generate the character 90 as requested.

Figure 5:
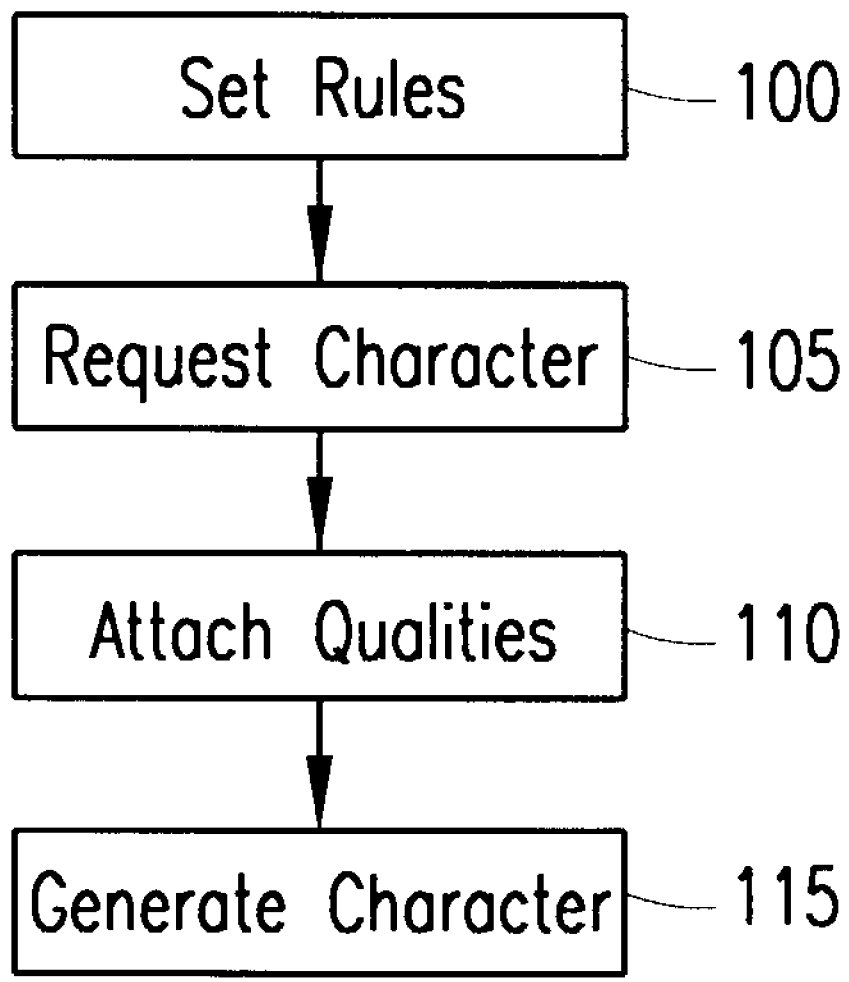
FIG. 5 is a flow diagram illustrating the operation of the embodiment of FIG. 3.

Referring now to FIG. 5, there is illustrated a flow diagram describing the method performed by the embodiment illustrated in FIGS. 3 and 4. Initially, at step 100, the composition rules 70 are determined and stored within the font manager 75. A print request 85 is provided at step 105, and the font name, size and style are attached to the character request at step 110. The font manager 75 generates at step 115 the desired character responsive to the attached font size, style and character using the rules 70.

Using the above-described system and method, a database providing a large number of fonts for an electronic device such as a portable computer, personal digital assistant, mobile telephone, etc. may be provided with a greatly decreased storage area necessary for the font database. Thus, a greater variety in the look of fonts can be provided while minimizing required resources and application complexity.

The previous descriptions are of preferred embodiments for implementing the invention, and the scope of the invention should not necessarily be limited by this description. The scope of the present invention is instead defined by the following claims.

What is claimed is:

1. A method for establishing a font database, comprising the steps of:
    storing a plurality of font files, each of the font files containing a character range and the plurality of font files containing no duplicate bitmaps;
    establishing a plurality of composite font files; and
    associating with each of the plurality of composite font files at least one pointer pointing to at least one of the plurality of font files, wherein selected ones of said plurality of font files are associated with multiple pointers for multiple composite font files.

2. The method of claim 1, wherein the step of associating further comprises the step of associating pointers with font files having characters sizes larger than a character size of the composite font file.

3. The method of claim 2, wherein the plurality of rules associates a plurality of characters each using a first bitmap with a single version of a bitmap.

4. The method of claim 2, wherein the plurality of rules associates characters having a same font and style but different sizes with a single version of a bitmap.

5. The method of claim 1, wherein the step of designating further comprises the step of establishing a set of rules for generating a character from selected ones of said plurality of font files responsive to a character request.

6. The method of claim 5, wherein said character request includes a font name, font size and font style.

7. A font database, comprising:
    a plurality of font files each storing bitmaps associated with a range of characters, the plurality of font files containing no duplicate bitmaps; and
    a plurality of composite font files, each of the plurality of font files containing at least one pointer pointing to one of the plurality of font files, wherein multiple pointers may point to a single font file.

8. The font database of claim 7, wherein at least one pointer points to a font file having a larger font size than a font size of the composite font file.

9. A composite font system, comprising:
    a plurality of font files each storing bitmaps associated with a range of characters, the plurality of font files containing no duplicate bitmaps; and
    a set of rules for generating a font character responsive to a print request, said rules enabling retrieval of a bitmap for a character from the plurality of font files.

10. The system of claim 9, wherein the set of rules are stored in a font manager.

11. The system of claim 9, wherein the set of rules enable retrieval of a single version of a bitmap with respect to a plurality of characters.

12. The system of claim 9, wherein the set of rules associates bitmaps of a larger size font with a smaller font size character.

13. The electronic device of claim 12, wherein the set of rules associates bitmaps of a larger size font with a smaller font size character.

14. An electronic device for implementing a font system comprising:

a plurality of font files each storing bitmaps associated with a range of characters, the plurality of font files containing no duplicate bitmaps;

a plurality of composite font files, each of the plurality of font files containing at least one pointer pointing to one of the plurality of font files, wherein multiple pointers may point to a single font file; and a display for displaying the bitmaps of the characters.

15. The electronic device of claim 14, wherein at least one pointer points to a font file having a larger font size than a font size of the composite font file.

16. An electronic device for implementing a font system, comprising:

a plurality of font files each storing bitmaps associated with a range of characters, the plurality of font files containing no duplicate bitmaps;

a set of rules for generating a font character responsive to a print request, said rules enabling retrieval of a bitmap for a character from the plurality of font files; and a display for displaying the bitmaps of the characters.

17. The electronic device of claim 16, further including a font manager for storing the set of rules.

18. The electronic device of claim 16, wherein the set of rules enable retrieval of a single version of a bitmap with respect to a plurality of characters.

* * * * *